United States Patent [19]
Gregory et al.

[11] 3,867,851
[45] Feb. 25, 1975

[54] RADIALLY EXPANSIBLE SPROCKET WITH ROTATABLE TEETH SEGMENTS

[75] Inventors: Lawrence Gregory, St. Paul; Lloyd Murphy; Donald H. Hagen, both of Minneapolis, all of Minn.

[73] Assignee: Hagen International Inc., Minneapolis, Minn.

[22] Filed: Aug. 23, 1973

[21] Appl. No.: 390,956

[52] U.S. Cl. ............................... 74/244, 74/230.16
[51] Int. Cl. ............................................. F16h 55/30
[58] Field of Search ............. 74/244, 230.16, 230.18

[56] References Cited
UNITED STATES PATENTS

| | | | |
|---|---|---|---|
| 524,830 | 8/1894 | Leggo, Jr. | 74/244 |
| 679,076 | 7/1901 | Johnston | 74/244 |
| 724,450 | 4/1903 | Dumaresg | 74/244 |
| 1,486,590 | 3/1924 | Landahl | 74/244 |
| 1,650,449 | 11/1927 | Jaeger | 74/244 |
| 2,421,368 | 5/1943 | Aubert | 74/244 |

FOREIGN PATENTS OR APPLICATIONS

| | | | |
|---|---|---|---|
| 176,511 | 3/1922 | Great Britain | 74/244 |
| 91,110 | 2/1923 | Germany | 74/244 |
| 753,146 | 10/1933 | France | 74/244 |
| 686,733 | 1/1940 | Germany | 74/244 |

Primary Examiner—Samuel Scott
Assistant Examiner—Allan R. Burke
Attorney, Agent, or Firm—James R. Cwayna

[57] ABSTRACT

A sprocket unit for a chain or similar positive drive mechanism, which sprocket is arranged to be moved radially inwardly and outwardly to thereby vary the ratio between a driven and driving member. The sprocket units are defined as sprocket segments which are rotatably mounted on a first pin member with stop member arranged relative to the chain engaging teeth such that the teeth will engage the chain without override of the chain with respect to the teeth. The sprocket segments are also biased to return the same to a generally central location such that they will be in position for the next subsequent chain engagement.

4 Claims, 6 Drawing Figures

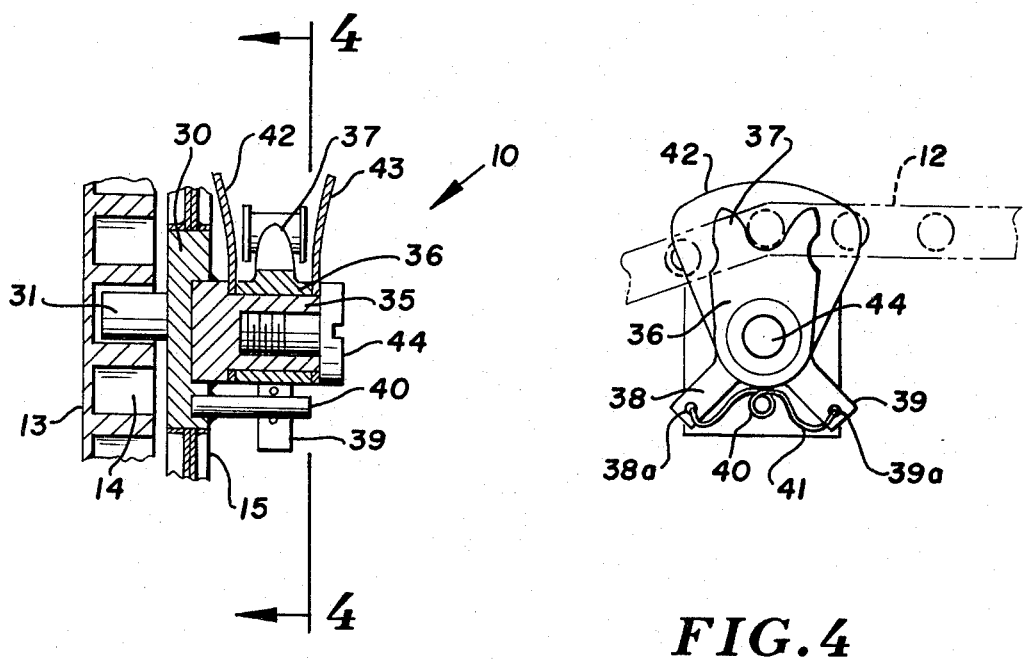
FIG. 3
FIG. 4
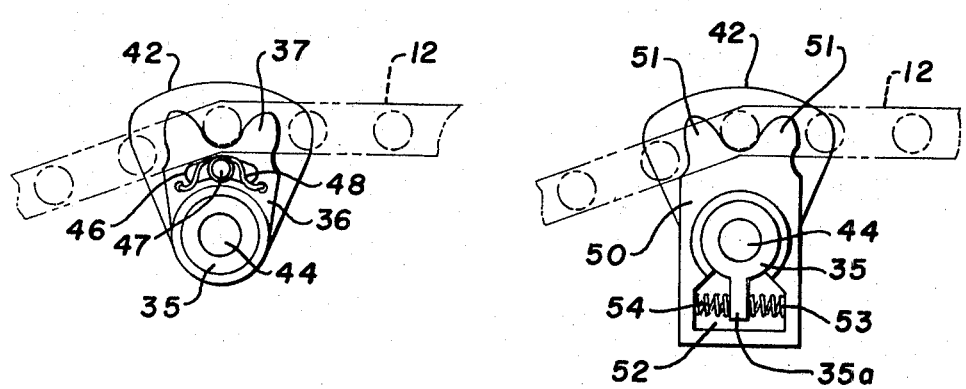
FIG. 5
FIG. 6

RADIALLY EXPANSIBLE SPROCKET WITH ROTATABLE TEETH SEGMENTS

Applicants have provided herein a sprocket unit which will permit the radial shifting thereof whereby a ratio variation may be obtained between a driving unit and a driven unit which units are connected through a positive connective and driving mechanism such as a chain or the like.

The aspect of applicants invention provides a self-centering means such that individual sprocket segments will engage with a chain and are relatively shiftable thereto such that there will be proper engagement between the teeth of the sprocket segment and the chain to prevent override of the chain. In addition to this consideration, the sprocket segments are self centering to permit a certain degree of rotation for the subsequent tooth alignment with the chain.

With applicants concept, it is not necessary to provide any type of one-way drive mechanism for the individual sprocket members or segments and therefore the loading requirements for proper distribution and carrying of the load is substantially simplified.

As also illustrated and discussed herein, applicants provide an operative alignment configuration for the individual sprocket segments to properly position and control the position of the positive connective element.

It is therefore an object of applicants' invention to provide a radially displaceable sprocket unit which is capable of receiving and driving a positive drive element such as a chain or the like without disrupting the chain movement.

It is a further object of applicants' invention to provide a plurality of driving chain sprocket segments about a driving member, which sprocket segments are radially displaceable, and which sprockets are alignable with a chain being driven thereby to provide smooth chain driving action therefrom.

It is still a further object of applicants' invention to provide a means for maintaining chain alignment while a chain member or similar positive drive mechanism is driven by a plurality of driving members which driving members are capable of being shifted to a plurality of various radial locations for variation in driving ratios.

It is still a further object of applicants' invention to provide a sprocket unit which is designed to engage a positive drive mechanism such as a chain and to drive the same about a predetermined path and thereafter to be returned to a proper, generally central, chain pickup location such that subsequent chain engagement will be maintained without the possibility of the chain being racked or improperly picked up by the sprocket or sprocket segments.

These and other objects and advantages of applicants' invention will more fully appear from the following description made in connection with the accompanying drawings, wherein like reference characters refer to the same or similar parts throughout the several views, and in which:

FIG. 3 is a partial radial section taken substantially along Line 3—3 of FIG. 1 and illustrating a typical mounting arrangement for the individual sprocket units;

FIG. 4 is a section taken substantially along Line 4—4 of FIG. 3 and illustrating a preferred form of applicants' invention, the driven chain member being illustrated in phantom lines therearound;

FIG. 5 is a view similar to FIG. 4 and illustrating a modified form of the invention and again illustrating the driven chain member in phantom lines therearound and in contact with the sprocket teeth; and, FIG. 6 is a view similar to FIG. 4 and illustrating a second modified form of the invention and again illustrating a driven chain member in phantom lines.

Figure 1:
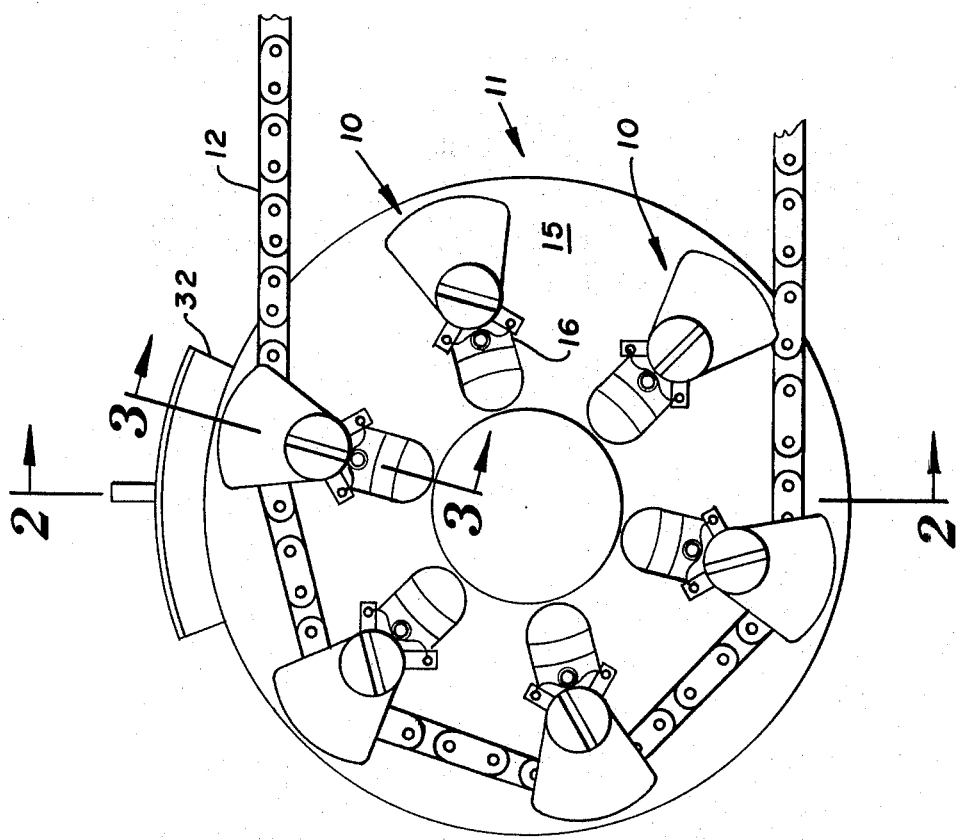
FIG. 1 is a side elevation of a sprocket device which employs sprocket units embodying the concepts of applicants' invention and illustrating the chain alignment devices utilized thereon.

In accordance with the accompanying drawings, applicants' sprocket unit is generally designated 10 and a plurality of such devices are illustrated in FIG. 1 as being arranged in arcuately spaced relation about a driving plate combination 11 such that the sprocket units 10 will contact, engage and drive a chain 12.

Figure 2:
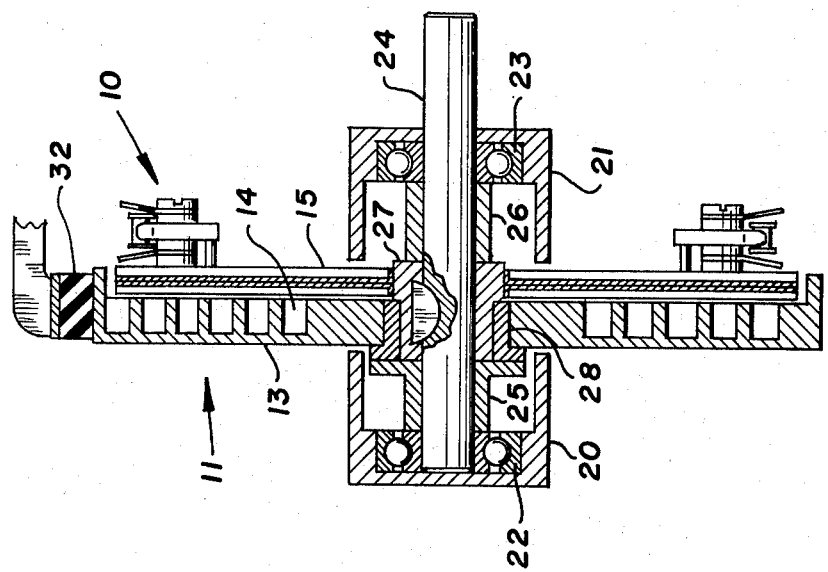
FIG. 2 is a vertical section taken substantially along Line 2—2 of FIG. 1 and illustrating the means for radial displacement of the sprocket units.

The driving plate combination 11 is best illustrated in the cross section of FIG. 2, and as shown therein, a first plate 13 having a continuous scroll groove 14 on one side thereof is provided and a drive plate 15 is provided, which drive plate 15 has a plurality of radially extending grooves 16 in which the individual sprocket members 10 are carried for radial displacement. A discussion of the particular arrangement to move these sprocket units 10 will be made in conjunction with FIG. 3.

As illustrated in FIG. 2 a simple driving mechanism for the plate combination 11 is provided and this includes a pair of spaced housing members 20, 21 having bearings 22, 23 therein to carry a drive shaft 24. Bushing members 25, 26 may be provided about the shaft for proper location of the driving plate combination 11 thereon. Arranged along the drive shaft 24 is a first driving boss 27 which is keyed to the shaft 24 such that the same will rotate therewith. Drive plate 15 is fixedly attached to this driving boss 27 such that it will continually rotate therewith. A third bearing member 28 is provided about the boss 27 and scroll plate 13 is mounted thereon such that the same may be free to rotate relative to the driving plate 15. Normally, as illustrated in FIG. 3, the individual sprocket elements 10 are carried for sliding movement in the drive plate 15 on a carrier member 30 and this carrier member is provided with a guide 31 which extends into the scroll plate 13.

A braking device designated 32 is provided to contact the scroll plate 13 at desired times and when the brake 32 is applied to the scroll late 13 the driving plate 15 will more relative thereto and the guiding peg 31 will cause the carrier 30 and thence the sprocket drive 10 to move inwardly and outwardly along the radial path 16. When the brake 32 is not applied the two plates 13 and 15 will rotate together. When the two plates rotate together there is no radial shifting of the individual sprocket members 10.

In the first preferred form of the invention, as illustrated in FIGS. 3 and 4, and as illustrated in the section of FIG. 4, a first extending bearing member 35 is provided in the carrier plate 30. It should be stated that this carrier plate 30 is captured in the radially extending groove 16 such that the same may move radially therein but is prevented from slipping out of this groove.

About this first bearing member, a sprocket segment designated 36 is provided and this sprocket segment 36 is provided with at least a pair of chain engaging teeth 37 on the radially, outwardly extending end thereof. This sprocket segment 36 is mounted for pivotal rotation about the bearing member 35 and is limited in its rotational aspect by a radially inwardly directed pair of arm members 38, 39, which are spaced arcuately about the lower portion of the sprocket 35 and a pin member 40 which extends outwardly from the carrier block 30. As illustrated in FIG. 4, it would be obvious that a certain amount of limited rotation of the sprocket is permitted about the bearing 35 before the arm members 38, 39 will contact the stop pin 40.

The concept of this application is to provide a means for properly engaging the rollers of the chain by the teeth 37 and this free floating situation permits this to take place. With this floating situation, the sprocket element 36 and its corresponding teeth, whether two or more such teeth are utilized, will positively engage the chain without causing the same to override the teeth or be ganged -and hung up thereon.

In order to properly position the teeth for the next subsequent operation, a biasing member, such as spring 41 is provided which is a dual torsion spring which will, in at least a first suggested form, entirely wrap around the pin 41 and will be attached to the extending arms of the inwardly directed elements 38, 39 at attachment points 38a, 39a. This is a standard type dual spring and will serve to bring the teeth into a proper radial relationship such that as the drive plate 15 is rotated, the segment will properly engage the rollers of the chain.

As also illustrated in FIGS. 3 and 4, a pair of outwardly extending chain guides 42, 43 are provided adjacent the sprocket member 36 such that they are oppositely disposed from the teeth 37 thereof and such that the chain will be received therein and held therein as the same is carried by the teeth 37.

As illustrated in FIGS. 3 and 4, a capturing element such as a threaded cap screw 44 is provided which will hold the entire asseembly onto the bearing member 35.

A first modified form of the invention is illustrated in FIG. 5 wherein the section taken is similar to that of FIG. 4 and the same numerals are utilized to designate the bearing 35, the capturing nut 44, the sprocket element 36, the teeth 37 and the chain 12. In this modified form of the invention, a curvilinear slot 46 is provided between the bearing member 35 and the teeth portion 37 and a pin member 47 is arranged in slot 46 which pin 47 is carried by the carrier plate 30. In this form, the sprocket unit 36 is free to pivot about the bearing member 35 and will normally abut the pin member 47 at the ends of the curvilinear slot 46. A spring member 48 is provided to center the teeth on a radial line to the drive shaft and the bearing 35 when no chain load is placed thereon. It should be obvious that the load is carried by the pin 47 when the sprocket element 36 has been rotated to a sufficient degree.

A second modified form of the invention is illustrated in FIG. 6 wherein the attachment element is again designated 44, the bearing member is designated 35, the sprocket in this case being designated 50 with extending, chain engaging teeth 51 thereon but in this case, the bearing member 35 is provided with an extending arm 35a which is received into an aperture 52 formed in the sprocket element 50, which aperture 52 is provided with a pair of spring members 53, 54 on opposite sides of the extending arm 35a of the bearing 35. The concept of this particular modified form is to provide a key way type situation wherein a certain amount of rotation is permitted before the stop or arm 35a will abut with the sides of the aperture 52. The purpose of the springs 53, 54 is to provide a centering situation when the load is removed from the sprocket teeth 51.

In each of the forms illustrate, applicants' concept is to permit limited rotation of sprocket elements or segments fuch that the same will be self centering with regard to the rollers of the carried chain and therefore will properly engage the chain rollers between the extending teeth and will not allow these rollers to ride over or upon the top of the teeth. Also, it should be noted that the load is carried by the stop pin and therefore no bearing loading or the like is presented. It should also be noted that this unit will be operable in either a clockwise or counter-clockwise situation.

In each of the various forms, it should be noted that the chain alignment ears 42, 43 are provided to retain the chain on the individual sprocket segments. Obviously means must be provided to prevent rotation of these ears relative to the sprocket segments but this may be easily accomplished with various stop means.

Applicants' have provided herein a unique sprocket unit which will insure the proper reception of a chain therin for driving thereof and which will also retain the chain in proper alignment with a driven sprocket. This is true for any radial location of the sprocket segments and is true for any radial shifting of the segments which shifting may occure during any driving relation.

What we claim is:

1. A sprocket unit for chain drive mechanisms, such mechanisms have a driving member and at least one such sprocket unit thereon for engaging a chain and driving the same, said sprocket including:
    a. a bearing member mounted on said driving member;
    b. a sprocket segment having at least two radially outwardly extending, chain engaging teeth thereon and a pair of radially inwardly extending arm members arranged thereon, said segment being mounted for rotation about said bearing; and,
    c. stop means for limiting the rotation of said segment about said bearing member, said stop means being arranged between said arm members whereby said segment is brought into driving engagement with the chain and upon engagement with said stop, will drive the chain.

2. The structure set forth in claim 1 and biasing means arranged and constructed to radially locate such teeth.

3. A sprocket unit for chain drive mechanisms, such mechanisms having a driving member and at least one such sprocket unit thereon for engaging a chain and driving the same, said sprocket including:
    a. a bearing member mounted on said driving member;
    b. a sprocket segment having at least two radially outwardly extending, chain engaging teeth thereon, said sprocket segment being mounted for rotation about said bearing;
    c. a passage being provided between said bearing and said teeth on said sprocket segment; and
    d. stop means for limiting the rotation of said segment being located in said passage, said passage being shaped to permit limited rotation of said segment before engagement with said stop member whereby said segment is brought into driving engagement with the chain and upon engagement with said stop, will drive the chain.

4. The structure set forth in claim 3 and biasing means means arranged to radially located said teeth.

* * * * *